United States Patent [19]
Johnson et al.

[11] Patent Number: 5,653,274
[45] Date of Patent: Aug. 5, 1997

[54] DEBARKER ARMS AND DEBARKER TIPS FOR MOUNTING ON LOG BARKING MACHINES

[76] Inventors: Denis Johnson; Yvon Johnson, both of P.O. Box 1120, Campbellton New Brunswick, Canada, E3N 3H4

[21] Appl. No.: 521,074

[22] Filed: Aug. 29, 1995

[30] Foreign Application Priority Data

Aug. 29, 1994 [CA] Canada ................... 2131066

[51] Int. Cl.$^6$ ................................................. B27L 1/00
[52] U.S. Cl. .................. 144/208.8; 144/241; 407/104; 407/42; 407/113
[58] Field of Search .................. 407/42, 113, 114, 407/104; 144/208.1, 208.3, 208.8, 241, 341

[56] References Cited

U.S. PATENT DOCUMENTS

| | | |
|---|---|---|
| 1,838,520 | 12/1931 | Archer . |
| 2,880,771 | 4/1959 | Annis, Jr. . |
| 3,045,322 | 7/1962 | Hertel . |
| 3,189,067 | 6/1965 | Dillingham . |
| 3,552,456 | 1/1971 | Johansson . |
| 3,629,919 | 12/1971 | Trevarrow, Jr. .................. 407/113 |
| 3,973,607 | 8/1976 | Jonsson . |
| 4,231,406 | 11/1980 | Jonsson . |
| 4,280,541 | 7/1981 | Reimler et al. .................. 144/208.8 |
| 4,653,559 | 3/1987 | Ackerman .................. 144/208.8 |
| 4,812,087 | 3/1989 | Stashko .................. 407/42 |
| 4,852,622 | 8/1989 | Eriksson .................. 144/241 |
| 4,872,495 | 10/1989 | Magnusson .................. 144/241 |
| 5,211,212 | 5/1993 | Carlson et al. .................. 144/241 |
| 5,443,334 | 8/1995 | Pantzar .................. 407/42 |
| 5,460,212 | 10/1995 | Darden .................. 144/241 |
| 5,486,073 | 1/1996 | Satran et al. .................. 407/42 |

*Primary Examiner*—W. Donald Bray

[57] ABSTRACT

A debarker arm for a debarking machine, comprised of a crescent shaped member, a debarker arm support, an outwardly forwardly extending flange, a debarker tip receptacle, and a debarker tip seated in said receptacle, the invention comprising said outwardly forwardly extending flange extending above and forwardly of said debarker tip in the direction of incoming logs.

12 Claims, 2 Drawing Sheets

DEBARKER ARMS AND DEBARKER TIPS FOR MOUNTING ON LOG BARKING MACHINES

This invention relates to debarker arms and debarker tips for mounting on the end of the debarker arms. The debarker arms with debarker tips are for mounting on barking machines of the type having a number of arms mounted in an annular rotating member and pressed radially inwardly into contact with a log being fed axially therethrough to remove the bark from logs.

The debarker arms of the current invention have fastening means at their inner end to fasten the debarker arm to the inside of the annular rotating member. The outer end of the debarker arm has a receptacle for receiving and retaining a debarker tip. The debarker arms of this invention are fabricated from high strength alloy steel. The debarker unit has a flange extending towards the log entrance end of the annular rotating member, the flange is located above and extends in front of the debarker tip to protect the edge of the debarker tip from damage by the ends of incoming logs. A lip on the log entry side of the debarking arm immediately in front of the debarker tip receptacle also protects the debarker tip facing the incoming log from excessive damage from the incoming log.

The debarker tips of the present invention have a plurality of debarking edges. Only one edge engages the log at any time for the purpose of debarking the log. When the log engaging edge of a tip is worn the debarking tip is unfastened or loosened sufficiently to rotate the debarking tip in the debarking arm receptacle to locate a fresh log engaging edge of the debarker tip and the debarker tip is firmly fastened in the debarker arm receptacle. The procedure of unfastening or loosening the debarker tip is followed each time the log engaging edge of the debarker tip becomes dull or is damaged. The debarker tip is rotated through ninety degrees if a four edged debarking tip is used and a fresh sharp unused surface of the debarker tip is located in the log engaging position.

BACKGROUND OF THE INVENTION

Debarker tips having four scraping surfaces are in use but such debarking tips can only be used on three sides as the side which first faces the log coming axially through the arms encounters the end of the log and is frequently damaged such that the first surface of the debarker unit to face the incoming log is not later available for use in debarking.

Existing debarking tips which are in use have relatively thin and relatively dull surfaces which are often damaged by the frozen bark encountered in debarking logs in northern climates in the winter. The relatively dull surfaces of existing debarking tips when used on frozen logs result in some breakage of debarker arms currently in use.

SUMMARY OF THE INVENTION

In the instant invention the debarking tips which are mounted on the free end of the debarking arm are protected by a lip on the log entry side of the debarker arm below the top of the debarker tip. The lip on the log-entry side of the debarking arm protects the debarker tip facing the incoming log. Protecting the edge of the debarker tip facing the incoming log makes that edge of the debarker tip available for later debarking when the debarker tip is rotated into log engaging position.

The end of the lip extending upwardly from the side of the recess in which the debarker tip is mounted also serves to prevent the log engaging edge of the debarker tip from cutting too deeply into the wood of the log being debarked. The sharp edge of the log-engaging edge of the debarker tip is designed to run between the bark and the wood of the log. The end of the lip extending along the log-entry side of the log extends to a position below one edge of the log engaging edge of the debarker tip preventing the tip from digging too deeply into the wood of the log.

The debarker tips of the invention have edges with the general cross-sectional shape of an isosceles triangle with a substantial base. A wear resistant coating is applied to the inside edge of the debarker tips. The debarker tips are sharp which increases their effectiveness in debarking frozen logs during the winter.

A flange on the log entry side of the debarker arm extends forwardly of the mounted debarker tip. The flange on the log entry side of the debarker arm also extends above the back edge of the mounted debarker tip. When a new log enters axially through the annular rotating member in which the debarker arms are mounted, the front of the log will strike the forward edge of the flange of the debarker arm as opposed to the edge of the debarker tip facing the entering log. The lip on the log entry side of the debarker tip referred to above also serves to protect the edge of the debarker tip on the log entry side from engaging the entering log.

The debarker arms of the instant invention are manufactured from alloy steel. The alloy steel debarker arms are less susceptible to damage than debarker arms which are cast.

One embodiment of the invention relates to a debarker arm for a debarking machine, comprised of a crescent shaped member, a debarker arm support, an outwardly forwardly extending flange, a debarker tip receptacle, and a debarker tip seated in said receptacle, the invention comprising said outwardly forwardly extending flange extending above and forwardly of said debarker tip in the direction of incoming logs.

In another embodiment the invention relates to a debarker arm for a debarking machine, comprised of a crescent shaped member, a debarker arm support, an outwardly forwardly extending flange and a debarker tip receptacle, the invention comprising said outwardly forwardly extending flange extending above and forwardly of said debarker tip receptacle in the direction of incoming logs.

In still another embodiment the invention relates to a debarker tip for mounting on a debarker arm, the debarker tip being comprised of an integral base, body and cutting tips, the base extending downwardly from the body and the cutting tips extending upwardly from each side of the body, the cutting edges increasing in thickness from the exterior cutting surface to the body.

DETAILED DESCRIPTION OF THE PREFERRED EMBODIMENTS

Figure 1:
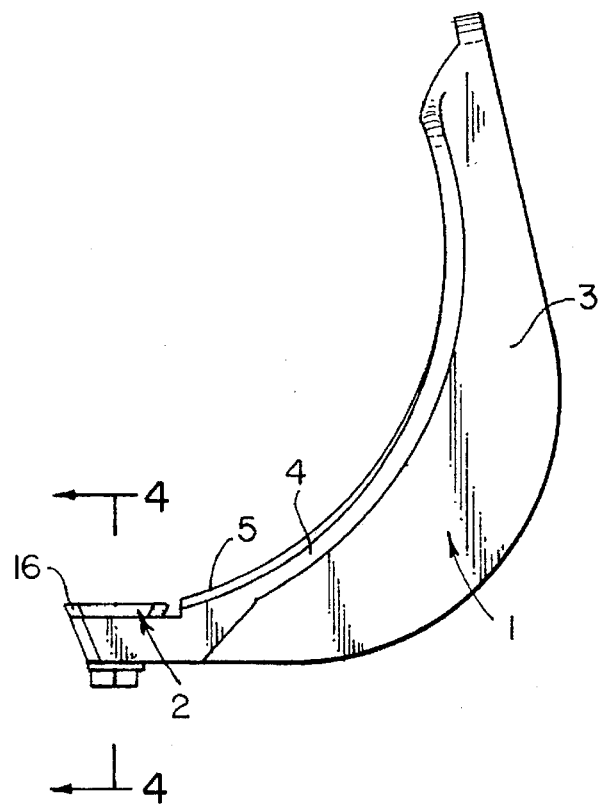
FIG. 1 is a view of the debarker arm and debarker tip as seen from the log entry side of the rotating member in which a plurality of arms are mounted.
Figure 2:
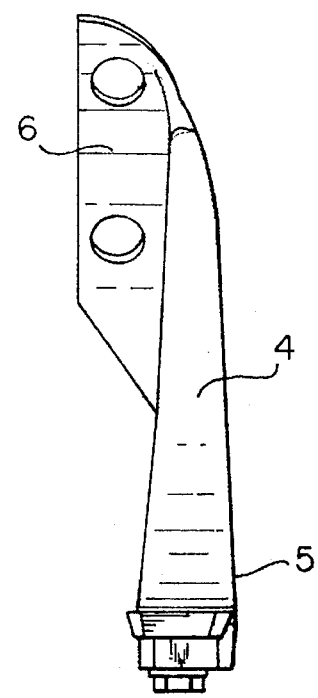
FIG. 2 is a view of the debarker arm and log engaging edge of the debarker tip as seen from the axis of the rotating member in which a plurality of arms are mounted.

Referring to FIG. 1, the debarker arm is indicated by the number 1 and the debarker tip is indicated by the number 2. The debarker arm 1 is formed of a crescent shaped piece of steel 3. A flange 4 extends outwardly forwardly on one side along the top of the crescent shaped piece of steel 3. The outwardly forwardly extending flange 4 commences near the arm support of the crescent shaped piece of steel 3 and ends immediately before the debarker tip 2. As seen in FIG. 2 the flange 4 increases in width from the top of the debarker arm and is at its widest immediately above the debarker tip 2. As seen in FIG. 2 the flange 4 extends forwardly of the debarker tip at the base to protect the front edge of the debarker tip 2 from logs entering the rotating member at a right angle to the flange 4. As seen in FIG. 1 the base 5 of the lower end of flange 4 near the debarker tip 2 is higher than the back edge of the debarker tip 2 to protect the log entry side of debarker tip 2 from being struck by incoming logs. As seen in FIG. 2 the upper end of the crescent shaped steel member 3 has an arm support flange 6 extending horizontally therefrom in the opposite direction to flange 4. The arm support flange 6 may take other forms depending on the form of the arm support receptacle of the rotating member to which the debarker arm 1 is to be fastened.

Figure 4:
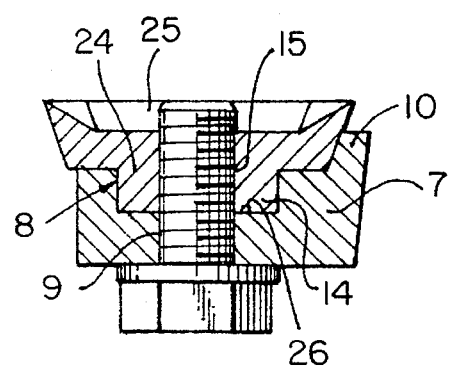
FIG. 4 is a cross-sectional view of the debarker tip of this invention mounted in the recess at the end of the debarker arm of FIG. 1.
Figure 5:
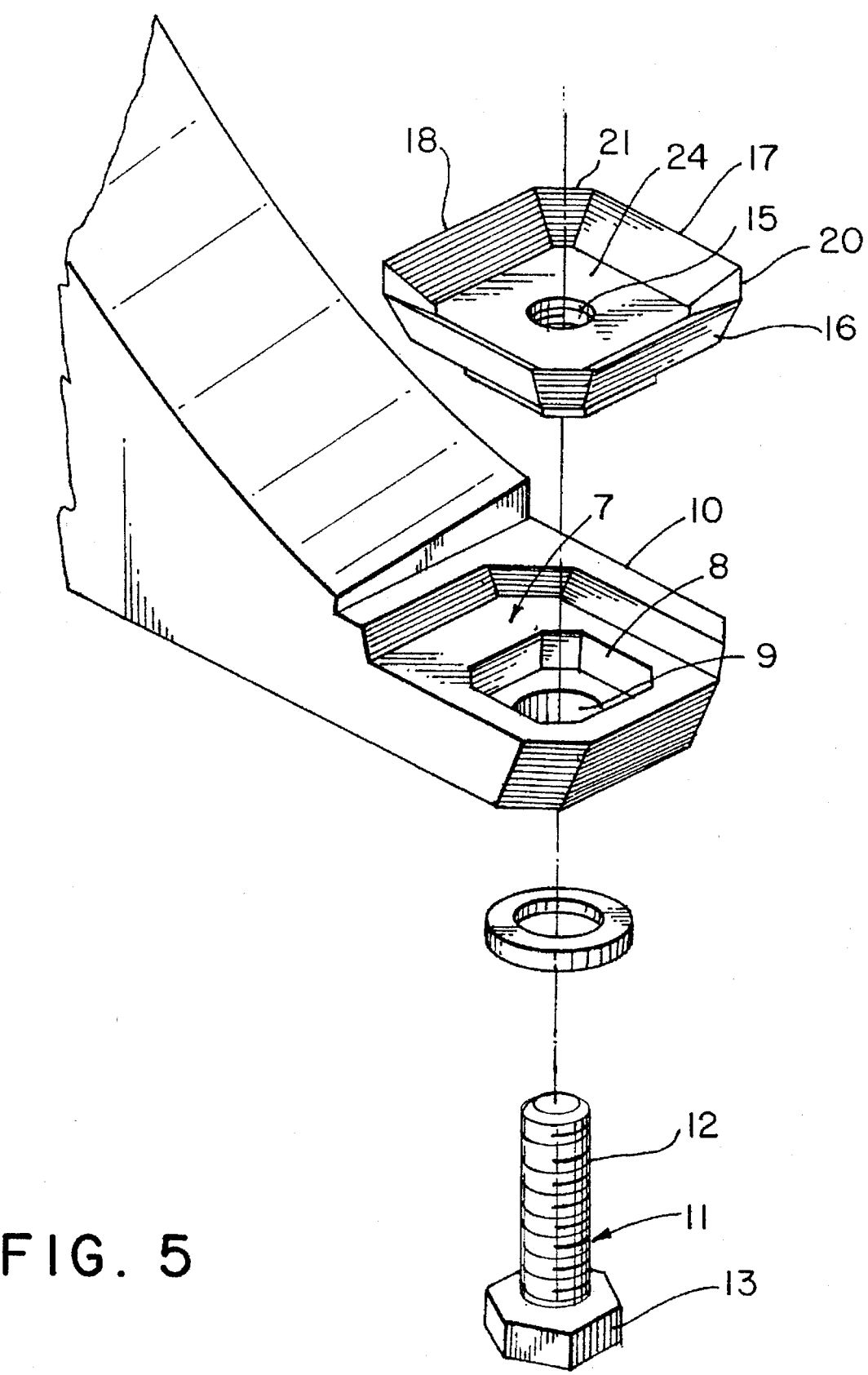
FIG. 5 is a perspective axonometric view of the end of the debarker arm and debarker tip as viewed perspectively from the side and rear of the view in FIG. 1.

As best seen in FIGS. 1 and 4 a solid piece of steel forming a debarker tip receptacle 7 is welded to the crescent shaped steel member 3 and flange 4. The debarker tip receptacle 7 includes a recess 8, an annular opening 9 and an upstanding lip 10. As seen in FIG. 4 the annular opening in the base 26 of the debarker tip receptacle 7 is threaded to receive a bolt 11 having a threaded portion 12 and a head 13.

As seen in FIG. 4 the debarker tip 2 has a base 14 having an exterior shape corresponding to the shape of the recess 8 for receipt and retention in the recess 8. Integral with and extending outwardly upwardly from the base 14 is the body 24 of the debarker tip 2. The debarker tip 2 has a central threaded annular aperture 15 adapted to receive the threaded portion 12 of bolt 11.

Figure 3:
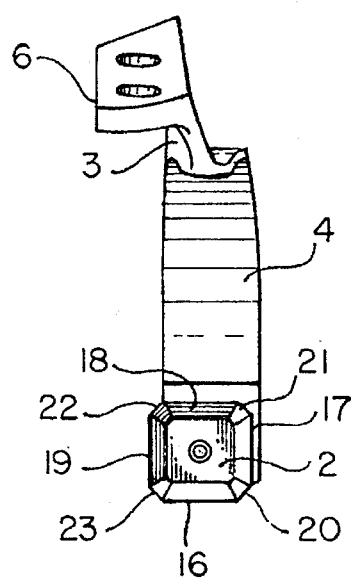
FIG. 3 is a top view of the debarker arm and debarker tip as viewed from the top when mounted in the rotating member supporting a plurality of arms.

As seen in FIG. 3 the body 24 of debarker tip 2 has four cutting edges 16, 17, 18 and 19 and four chamfered edges 20, 21, 22 and 23 located between the cutting edges 16, 17, 18 and 19. As seen in FIG. 4 the recessed interior 25 of the body 24 of the debarker tip 2 is centrally recessed. The four cutting edges 16, 17, 18 and 19 are triangular in cross section, the width of the cutting edges 16, 17, 18 and 19 increases from top to bottom. The interior angle of the cutting edges is at least 30°. The inside of the cutting edges 16, 17, 18 and 19 are hardened to maintain the sharp edges of the cutting edges 16, 17 18 and 19.

The debarker tips 2 are detachable from the lower end of the debarker arm 1 by removal of the bolt 11. It is also possible to loosen the bolt 11 so as to release the base 14 of the debarker tip 2 from the recess 8 of debarker tip receptacle 7 and turn the debarker tip 2 to present a fresh cutting edge 16, 17, 18 or 19 to the log contacting position in which edge 16 is shown in FIGS. 1 and 3. With a fresh cutting edge 16, 17, 18 or 19 in position the base 14 of the debarker tip 2 is lowered into the debarker tip receptacle 7 and the bolt 11 is tightened securing the base 14 in the debarker tip receptacle.

In operation, the debarker arms 1 and other debarker arms are mounted in an annular rotating member. The debarker arms 1 are pressed radially inwardly. The log is fed into the annular rotating member axially. The end of the log strikes the flange 4 of the debarker arm 1 which extends forwardly and above the debarker tip 2 relative to the incoming log, protecting the cutting edge of the debarker tip 2 facing the incoming log from substantial contact with the incoming log. The upstanding lip 10 extends upwardly on the end of the debarker arm 1 partially covering the side of the cutting edge of the debarker arm facing the incoming log, providing further protection to the edge of the debarker tip 2 facing the incoming log.

When the end of the log has passed the debarker arm 1 the cutting edge of the debarker tip 2 engages the bark of the log and begins removing bark from the log as the annular rotating member supporting the debarker arms rotates about the log which is being fed axially through the annular rotating member.

The heat treatment of the debarker tips is known in the art and suitable hardening materials may be applied to the inside edge of the debarker tip in the conventional manner. It will be apparent to those skilled in the art that variations may be made to the details of the debarker arms and debarker tips described herein without departing from the invention.

We claim:

1. A debarker arm for mounting in a rotor of a debarking machine, the rotor and debarking arm having a log entry side and log exit side, the debarker arm comprised of an integral debarker arm support, a debarker arm body, debarker tip receptacle, and a debarker receptacle lip, characterized in that the debarker arm receptacle is comprised of receptacle located behind the receptacle lip on the log entry side of the debarker arm receptacle, the lip extending substantially to the end of the debarker arm receptacle.

2. The debarker arm of claim 1 in which the debarker tip receptacle is located below the upper surface of the body of the debarker arm.

3. The debarker arm of claim 2 in which the debarker tip receptacle is comprised of a base, a recess and a threaded aperture defining an annular threaded opening and a lip, the annular threaded opening in the receptacle is located on the vertical axis of the recess.

4. A debarker tip for mounting on a debarker arm, for mounting in a rotor of a debarking machine, the rotor, debarking arm and debarker tip having a log entry side and a log exit side, the debarker tip having a log engaging side, the debarker tip being comprised of an integral base and body, the body having a central recess, four chamfered edges and four cutting edges, a threaded aperture defining an opening through the interior recess and base of the debarker tip, the threaded opening located on the vertical axis of the body and base of the debarker tip.

5. The debarker tip of claim 4 in which the interior angle of the cutting edges of the debarker tip is at least 30°.

6. The debarker tip of claim 5 in which the interior surfaces of the cutting edges are metal hardened.

7. The debarker tip of claim 6 in which the cutting edges of the debarker tip are sharp.

8. The debarker tip of claim 5 in which the debarker tip is machined from a single piece of steel.

9. A debarker arm for mounting in a rotor of a debarking machine, the rotor and debarking arm having a log entry side and a log exit side, the debarker arm comprised of an integral debarker arm support, a debarker arm body, debarker tip receptacle, debarker receptacle lip, and a replaceable debarker tip, characterized in that the debarker receptacle lip extends substantially to the end of the debarker arm receptacle.

10. The debarker arm and debarker tip of claim 9 in which the debarker tip is comprised of an integral base and body, the body having a central recess, four chamfered sides and four cutting edges and means to fasten the debarker tip to the debarker arm receptacle.

11. The debarker arm and debarker tip of claim 10 in which the debarker tip may be unfastened, rotated in the debarker tip receptacle, and refastened to provide a fresh active cutting edge for debarking.

12. The debarker arm and debarker tip of claim 11 in which the end of the debarker receptacle lip is slightly lower than the active cutting edge of the debarker.

* * * * *